Nov. 1, 1949.  J. W. HOLMES, JR  2,486,409
COMBINATION MOTOR VEHICLE JACK AND WHEEL
Filed Feb. 18, 1947  2 Sheets-Sheet 1

Inventor
JOHN W. HOLMES, JR,

By McMorrow, Berman & Davidson
Attorneys

Nov. 1, 1949.  J. W. HOLMES, JR  2,486,409
COMBINATION MOTOR VEHICLE JACK AND WHEEL
Filed Feb. 18, 1947  2 Sheets-Sheet 2

Inventor
JOHN W. HOLMES, JR.

Patented Nov. 1, 1949

2,486,409

UNITED STATES PATENT OFFICE 2,486,409

COMBINATION MOTOR VEHICLE JACK AND WHEEL

John W. Holmes, Jr., Huntington, N. Y.

Application February 18, 1947, Serial No. 729,287

3 Claims. (Cl. 280—150)

1

This invention relates to motor vehicle jacks, particularly of the type wherein individual jacks are permanently attached to the chassis of the vehicle and associated with each of the wheels and actuated by control buttons on the instrument board; and, in particular, a jack-knifing frame with a wheel rotatably mounted therein and with a hydraulic cylinder positioned thereon so that a piston rod extending therefrom may be connected to the axle of the wheel to force the wheels downward into operative position when the tire of a wheel with which the device is associated fails.

The purpose of this invention is to provide auxiliary wheels in combination with the wheels of motor vehicles wherein, upon failure of a tire, an auxiliary wheel associated therewith may be lowered to take the load until the vehicle is brought to a stop to prevent damaging the tire.

Substantially all operators of motor vehicles are subjected at some time to the inconvenience of having a tire deflate either from a puncture, failure of the inner tube, or a blow-out, suddenly, which causes the vehicle to be thrown out of balance and almost out of control. Furthermore, at times an operator feels a tire getting soft while driving through a tunnel or on a highway, or bridge where traffic authorities will not permit stopping. With these thoughts in mind, this invention contemplates an auxiliary wheel associated with each wheel of a motor vehicle which is permanently mounted on and suspended from the chassis of the vehicle, and adapted to be instantly forced downward to temporarily take the load of the vehicle.

The object of this invention is, therefore, to provide an improved jack for motor vehicles in dividual jacks may be mounted on the chassis and associated with each wheel in which the jacks may be actuated from the instrument board of the vehicle with the vehicle in motion, or stationary.

Another object of the invention is to provide a combination motor vehicle jack and wheel that may be permanently attached to the chassis of the vehicle which is adapted to be mounted on vehicles now in use.

Another object of the invention is to provide a combination wheel and jack for motor vehicles that may be permanently attached to the chassis of the vehicle with one associated with each wheel in which the mounting frame through which the wheel is attached to the chassis is formed of pivotally attached levers and therefore of relatively light weight.

2

A further object of this invention is to provide a combination wheel jack adapted to be permanently attached to the chassis and associated with each wheel of a motor vehicle which is of a simple and economical construction.

With these and other objects in view, the invention includes a comparatively simple hydraulic cylinder having a base plate adapted to be attached to the under surface of the chassis of a motor vehicle with a wheel suspended in the lower end of a connecting rod extending therefrom and a supporting frame of jack-knife construction providing means for bracing the wheel in the operative position.

Other features and advantages of the invention will appear from the following description taken in connection with the drawings, wherein.

Figure 1:
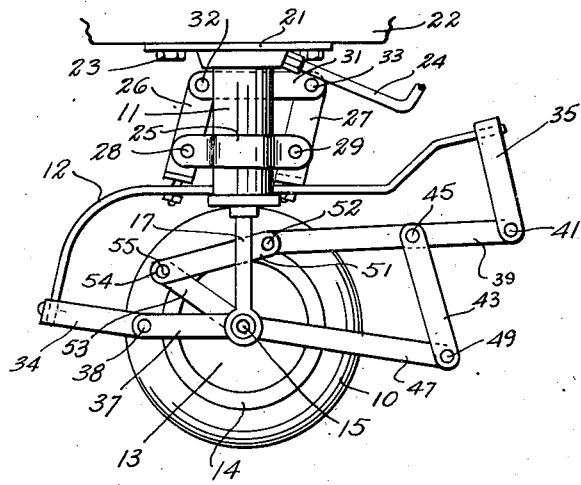
Figure 1 is a view showing a side elevation of the combination jack and wheel with the wheel in the elevated position, wherein the frame parts are folded.
Figure 2:
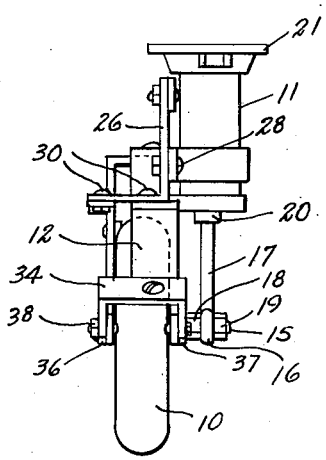
Figure 2 is a view showing an end elevation of the device illustrated in Figure 1.
Figure 3:
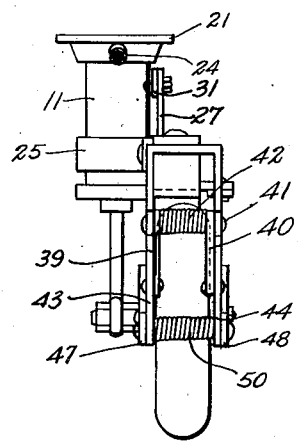
Figure 3 is a similar view looking toward the opposite end of the device.

Referring now to the drawings, wherein like reference characters indicate corresponding parts, the combination wheel and jack of this invention includes a wheel 10, a hydraulic cylinder 11 and a main bar 12 to which levers constituting a supporting frame are attached.

The wheel 10 may have a disc 13 with a rim 14, and may be provided with a pneumatic or solid tire, as may be desired. The wheel is rotatably mounted on an axle 15, one end of which is attached to an eye 16 at the lower end of a connecting rod 17 by lock nuts 18 and 19, and the rod extends vertically downward through a stuffing box 20 at the lower end of the cylinder 11, the upper end of which is provided with a base 21 that is permanently attached to a chassis 22 of a motor vehicle by bolts 23. The upper end of the cylinder is provided with a power connection 24 that may extend to a pump or any suitable means for supplying fluid under pressure.

The plate 12 of the frame is suspended at one side of the cylinder 11 through a clip 25, the ends of which are pivotally connected to vertically extending legs 26 and 27 of clip angles, by bolts 28 and 29, and the lower horizontally positioned legs of the angles are attached to the plate 12 by bolts 30. The upper ends of the legs 26 and 27 are pivotally connected by a link 31 through pins 32 and 33.

Figure 4:
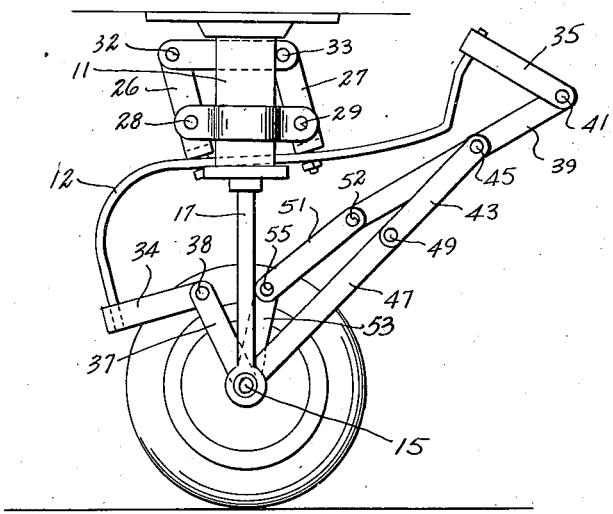
Figure 4 is a view similar to that shown in Figure 1, showing a side elevation of the device with the wheel extended and the supporting frame in the operative position.

The plate 12 is preferably of spring steel, and the ends are provided with U-shaped yokes 34 and 35, and the extending ends of the yoke are pivotally attached to a plurality of levers providing a jack-knife bracket which laterally supports the lower end of the connecting rod 17 in the downward or extended position. The extending ends of the yoke 34 are pivotally attached to an end of the links 36 and 37 on opposite sides of the wheel 10 through a short bolt 38, the other ends of the links being pivotally mounted on the wheel axle 15. The extending ends of the yoke 35 are pivotally attached to an end of levers 39 and 40 by a bolt 41, a spring 42 being provided on said bolt for normally urging the levers to the folded or jack-knife position, as illustrated in Figure 1. The levers 39 and 40 intermediate their ends are pivotally connected to the upper ends of the links 43 and 44 by means of bolt 45, the bolt having a spring operatively connected thereto for normally urging the levers to the folded or jack-knife position. The lower ends of the links 43 and 44 are pivotally connected to the other ends of links 47 and 48 pivotally carried by the wheel axle 15 by means of a bolt 49, a spring 50 being provided on the bolt 49 which also urges the levers to the folded or jack-knife position. The inner ends of the levers 39 and 40 are pivotally attached to an end of a pair of links 51 by a bolt 52, the other ends of the links 51 each being provided with an opening 55. One end of links 53 pivotally carried by the wheel axle 15 is connected to a pivot pin 54 carried by the openings 55. The inner ends of the links 47 and 48 are also pivotally mounted on the axle 15, and it will be noted that with the wheel in the elevated position, as illustrated in Figure 1, the levers will be in the jack-knife or folded position, and when the wheel is forced downward, as illustrated in Figure 4, the levers will assume the outwardly extending or supporting position, as illustrated.

Figure 5:
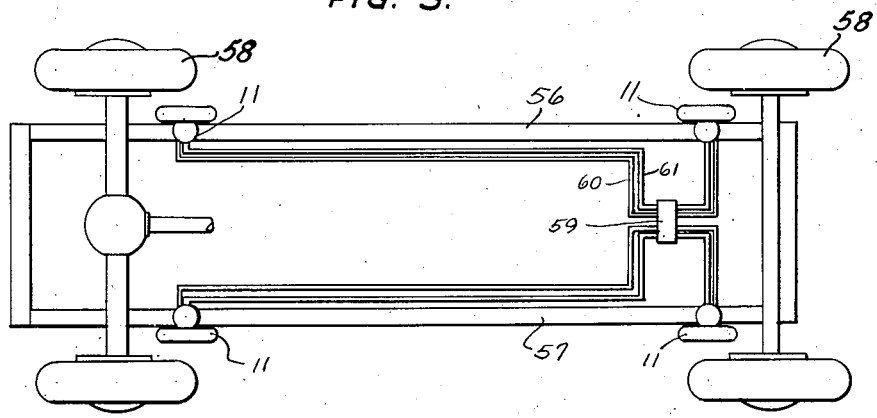
Figure 5 is a diagrammatic view showing the chassis of a motor vehicle illustrating the relative positions of the combination jack and wheel devices.

In the diagrammatic view illustrated in Figure 5, it will be noted that the cylinders 11 are positioned in opposite corners of a chassis having side members 56 and 57, and the jacks with the wheels 10 are mounted on the chassis so that they are comparatively close to wheels 58 of the vehicle. In this design the hydraulic cylinders may be controlled by a pump 59 having suitable supply and return connections 60 and 61 to the respective cylinders, and the pump may be controlled by buttons on the instrument board or any suitable means through which fluid may be admitted to or released from each of the hydraulic cylinders individually or collectively.

The combination jack and wheel of this invention, therefore, includes a cylinder adapted to be actuated by hydraulic pressure or a suitable fluid, a wheel rotatably mounted in the end of the connecting rod of the cylinder, and a supporting frame bracing the wheel for lateral movement which jack-knifes to a folded position with the wheel elevated, and which moves downward with the wheel when pressure is applied to the cylinder to force the wheel downward to operative position providing means for absorbing lateral strain and bracing the connecting rod. Thus, the supporting frame is automatically brought into effect as the wheel is brought into its operative position. The cylinder may be permanently mounted on the under side of the chassis of a motor vehicle with a complete device associated with each wheel of the vehicle, and the individual elements may be actuated independently, or in combination, and the action thereof may be controlled by buttons on the instrument board or control means located at any suitable point. The devices may be locked in their inoperative positions, and only actuated to relieve a wheel of the vehicle in an emergency.

The device is illustrated in the preferred design. However, it will be understood that modifications may be made in the design or relative positions of the parts without departing from the spirit of the invention.

What is claimed is:

1. In a motor vehicle jack, a vertically-disposed fluid-actuated cylinder positioned on the under side of the chassis of a vehicle including a wheel axle, a connecting rod extending vertically downward from the cylinder, and having its lower end rotatably mounted on said wheel axle, a substantially horizontally-disposed plate arranged on one side of said cylinder, means surrounding said cylinder and secured to said plate for suspendingly supporting the latter, a pair of links each pivotally mounted on opposite sides of said wheel axle and pivotally attached to one end of said plate, levers each having one end pivotally connected to the other end of said plate, resilient means operatively connected to the pivotal connection of said levers for normally urging the latter to folded position, a second pair of links each pivotally carried by the wheel axle, a third pair of links each having one end pivotally connected to the other end of said levers and having the other end pivotally connected to said second pair of links, a fourth pair of links each pivotally carried by said wheel axle, a fifth pair of links each having one end pivotally connected to said fourth pair of links and having the other end pivotally connected to said levers, and resilient means operatively connected to the pivotal connection of said fourth pair of links with said fifth pair of links for also urging the levers to folded position.

2. In a motor vehicle jack, a vertically-disposed fluid-actuated cylinder positioned on the under side of the chassis of a vehicle including a wheel axle, a connecting rod extending vertically downward from the cylinder and having its lower end rotatably mounted on said axle, a substantially horizontally-disposed plate arranged on one side of said cylinder, substantially vertically-disposed arms extending upwardly from the plate at the opposite sides of the cylinder, a clip on the cylinder having extending ends, means pivotally attaching the arms in the extending ends of the clip, a link pivotally connecting the upper ends of the arms, yokes with extending arms on opposite ends of the plate, a pair of links each pivotally mounted on opposite sides of said wheel axle and pivotally attached to one of the extending arms of said yokes, levers each having one end pivotally connected to the other extending arms of said yokes on the opposite end of the plate, resilient means operatively connected to the pivotal connection of said levers for normally urging the latter to folded position, a second pair of links each pivotally carried by the wheel axle, a third pair of links each having one end pivotally connected to the other end of said levers and having the other end pivotally connected to said second pair of links, a fourth pair of links each pivotally carried by said wheel axle, a fifth pair of links each having one end pivotally connected to said fourth pair of links and having the other end pivotally connected to said levers, and resilient means operatively connected to the pivotal connection of said fourth pair of links with said fifth pair of links and to the pivotal connection of said fifth pair of links with said levers for also urging the levers to folded position.

3. In a motor vehicle jack, a vertically-disposed fluid-actuated cylinder positioned on the under side of the chassis of a vehicle including a wheel axle, a connecting rod extending vertically downwardly from the cylinder and having its lower end rotatably mounted on said wheel axle, a substantially horizontally-disposed plate arranged on one side of said cylinder, means surrounding said cylinder and secured to said plate for suspendingly supporting the latter, a yoke having extending arms on each end of said plate, a pair of links each pivotally mounted on opposite sides of said wheel axle and pivotally attached to the extending arms of one of said yokes, levers each having one end pivotally connected to the other of the extending arms on the other of said yokes, resilient means operatively connected to the pivotal connection of said levers for normally urging the latter to folded position, a second pair of links each pivotally carried by the wheel axle, a third pair of links each having one end pivotally connected to the other end of said levers and having the other end pivotally connected to said second pair of links, a fourth pair of links each pivotally carried by said wheel axle, a fifth pair of links each having one end pivotally connected to said fourth pair of links and having the other end pivotally connected to said levers, and resilient means operatively connected to the pivotal connection of said fourth pair of links with said fifth pair of links for also urging the levers to folded position.

JOHN W. HOLMES, JR.

REFERENCES CITED

The following references are of record in the file of this patent:

UNITED STATES PATENTS

| Number | Name | Date |
| --- | --- | --- |
| 1,917,962 | Forrest | July 11, 1933 |
| 2,118,455 | Wallace | May 24, 1938 |
| 2,126,083 | Bailey | Aug. 9, 1938 |
| 2,140,264 | Kingham | Dec. 13, 1938 |